United States Patent [19]

Textor et al.

[11] Patent Number: 4,722,771

[45] Date of Patent: Feb. 2, 1988

[54] PROCESS FOR MANUFACTURING A PARTIALLY PERMEABLE MEMBRANE

[75] Inventors: Marcus Textor, Schaffhausen; Martin Werner, Singen; Wilhelm Franschitz, Neuhausen, all of Switzerland

[73] Assignee: Swiss Aluminium Ltd., Chippis, Switzerland

[21] Appl. No.: 932,152

[22] Filed: Nov. 18, 1986

[30] Foreign Application Priority Data

Nov. 25, 1985 [CH] Switzerland .......................... 5009/85

[51] Int. Cl.[4] .......................... C25D 5/48; C25D 5/44; B23H 9/14; C25F 3/04
[52] U.S. Cl. .......................... 204/37.6; 204/33; 204/38.3; 204/129.55; 204/295; 204/129.3; 204/129.95
[58] Field of Search ............. 204/129.1, 129.3, 129.75, 204/295, 33, 38.3, 129.55, 129.6, 37.6, 129.95

[56] References Cited

U.S. PATENT DOCUMENTS

| | | | |
|---|---|---|---|
| 2,859,148 | 11/1958 | Altenpohl | 204/33 X |
| 3,085,950 | 4/1963 | Thomas et al. | 204/129.43 |
| 3,352,769 | 11/1967 | Ruben | 204/295 X |
| 3,578,570 | 5/1971 | Kissin | 204/33 |
| 3,666,642 | 5/1972 | Alwan et al. | 204/129.55 X |
| 4,204,919 | 5/1980 | Randall, Jr. et al. | 204/33 X |
| 4,470,885 | 9/1984 | Randall, Jr. et al. | 204/33 X |
| 4,484,252 | 11/1984 | Ruijgrok et al. | 204/129.43 X |

*Primary Examiner*—Donald R. Valentine
*Attorney, Agent, or Firm*—Bachman & LaPointe

[57] ABSTRACT

A process for manufacturing a partially permeable membrane is such that a 20–200 μm thick aluminum foil in the non-recrystallized condition is etched in an electrolyte at a current density in the range 2–20 kA/m[2] and the surface given an after-treatment to prevent hydration reactions. The membrane is particularly suitable for ultrafiltration, gas separation or pervaporation and to that end can also be employed in combination with a polymer membrane.

17 Claims, No Drawings

PROCESS FOR MANUFACTURING A PARTIALLY PERMEABLE MEMBRANE

BACKGROUND OF THE INVENTION

The invention relates to the manufacture of a partially permeable membrane from an aluminum foil using electrolytic etching and relates also to the use of this membrane.

Partially permeable membranes are employed in a series of separation processes in which particles dispersed or dissolved in a liquid or gaseous medium have to be separated or in which gases have to be separated.

The membranes normally employed for that purpose are based on polymer foils and hollow polymer fibers. These, however, give rise to some difficulties which have serious consequences in certain applications: limited thermal stability (to some extent prohibits sterilization); limited stability in organic solvents, swelling in water, usually no electrical conductivity (for sensor applications).

Some help here is a process for manufacturing membranes having pore diameter 0.2 to 10 $\mu$m out of aluminum in which a recrystallized aluminum foil is electrolytically etched. In that case a first etching stage is employed with a constant anode potential, throughout the duration of the stage and above the pitting potential of the aluminum, and a second etching stage is employed with a constant anode potential below the pitting potential. A proposal for narrowing the pores further is made in which an aluminum oxide layer is anodically formed on the etched foils or a hydrated aluminum oxide layer is formed by treatment in boiling water, as a result of which pore diameters down to 0.002 $\mu$m can be achieved.

Aluminum membranes manufactured that way, however, suffer decisive disadvantages:

Potentiostatic etching is, in practice, very difficult to control. There is in particular the danger that the smallest deviation in the effective potential from the optimal value leads to an undesired micro-pitting which excludes the product from use as a membrane foil. Even more decisive is the fact, that the membranes manufactured by the above mentioned process are unstable as soon as they are employed for the filtration of aqueous media or non-aqueous media containing the smallest amount of water. This instability is expressed in a rapid drop in trans-membrane flow, which after a few hours is typically only 5 to 10% of the initial value and thus insufficient and uninteresting for microfiltration membranes compared to conventional polymer membrane foils. This drop is observed both with foils etched on one side and foils etched on both sides, with blank foils and with foils having an anodic aluminum oxide barrier layer.

SUMMARY OF THE INVENTION

The object of the invention is therefore to develop a process for manufacturing a partially permeable membrane which starts from aluminum foils, employs electrolytic etching and eliminates the above mentioned difficulties, viz., micro-pitting and instability.

This object is achieved by way of the invention in that a 20-200 $\mu$m thick aluminum foil is the non-recrystallized condition is etched in an electrolyte using a current density in the range of 2-24 kA/m$^2$ and, in order to stabilize the surface, is subsequently treated to prevent hydration reactions.

DETAILED DESCRIPTION

The foils to be etched can be in the cold rolled or recovered, non-recrystallized condition.

The etching of a foil which has been given a recrystallizing anneal would, however, lead to an inadequate density of pores.

In order to achieve the through-flow rate necessary in the filtration process and to make uniform etching easier, the aluminum foil may at most be 200 $\mu$m thick. This prevents the possibly necessary pressure difference across the membrane being too great during the separation process. Foils of thickness less than 20 $\mu$m do not do not exhibit sufficient mechanical stability and are in greater danger of suffering uncontrolled through thickness etching. Suitable etching solutions, which are also preferred, are chloride containing electrolytes employed in the temperature range 60°-100° C.

Electrolytes of the following composition have been found particularly suitable:

Chloride concentration 1 to 4 M; acids or alkali metal salts of the anions borate, phosphate, sulphate, nitrate at a concentration of 0.1 to 1 M (M=Mole/liter).

The total transformed charge should be 0.15 to 1.0 MC/m$^2$. The resulting pores running through the whole thickness of the foil are at most less than 0.1 $\mu$m in diameter.

In order to prevent instability that expresses itself as a drop in transmembrane flow in the course of time, stabilizing treatments that prevent hydration reactions have been found to be both necessary and effective.

The aluminum that comes into consideration is pure aluminum or an aluminum alloy. It turns out, however, that in the use of a foil of aluminum having an aluminum content of at least 99.95%, preferably at 99.98%, the uniformity and reproducibility of the desired pore size and shape is particularly high.

An additional measure, whithin the scope of the invention, for preventing a premature drop in transmembrane flow is to subject the aluminum foil to etching on only one side, for example by coating the other side of the foil with an etch resistant layer which as a rule is later dissolved away. The through thickness pores that result exhibit a diminishing cross-section with increasing depth. When used as a microfilter the flow of the solution through the filter is then arranged to be in the opposite direction as that of etching. Reductions in the pore cross-section due to increasing deposition in the pore with increasing pore depth are then compensated by the initial increase in pore cross-section. In a useful version of this process the maximum thickness of the aluminum foil is limited to 100 $\mu$m.

The etching can take place in one or more steps for example in a plurality of baths in series or also in one bath, if necessary with a plurality of zones in series that have to be passed through. Within each step the current density should be kept constant, whereby in practice deviations in current density of less than 5% still permit the term "constant" to be used. This galvanostatic method makes it possible to avoid micro-pitting. A preferred version of the etching according to the invention comprises 2 steps or 2 groups of steps whereby the current density in the first step of first group of steps is equal to 1.5-5 times the current density in the second step of group of steps. This leads to a particularly dense and uniform arrangement of etched-out pores.

In order to arrive at a simpler means of achieving pore diameters in the range of some hundredths or even thousandths of a μm a version of the process according to the invention is employed in which the etched pores are made narrower prior to the stabilizing after-treatment by anodizing in a barrier layer electrolyte. For this purpose one can employ known forming electrolytes such as boric acid, citric acid, adipic acid and others. A bath voltage of 7 V per 10 nm pore diameter reduction must be applied. This pretreatment assists the stabilizing effect of some of the after-treatments according to the invention.

A further version of the process that reinforces the stabilizing effect of the after-treatment comprises, prior to this after-treatment, the deposition of a boehmite layer on the etched foil surface that may, if desired, be provided with a barrier layer.

Preferably at least one of the following treatments is selected for the after-treatment to prevent hydration:

Anodizing in a phosphate-containing electrolyte that usefully exhibits a conductivity of 1 to 20 mS and is made up of an aqueous solution of $(NH_4)H_2PO_4$. The bath temperature should be 60° to 100° C., typically 85° C. The voltage to be applied is between 10 and 500 V, typically 20 V.

Immersion in a phosphate solution having an $(NH_4)H_2PO_4$ concentration of 0.5%, usefully for 1 to 30 minutes at a bath temperature of 60° to 100° C. In a preferred version this solution is allowed to flow through the etched foil which, if desired, features a barrier layer.

Immersion in a silicate solution for example alkali-silicates, in a chromate solution for example alkali chromate or in a chromo-phosphate solution.

Covering the whole foil surface with a chemically stable oxide layer; particularly favorable within the scope of the invention are $SiO_2$ or $TiO_2$ layers. The corresponding process comprises the precipitation of an organic Si or Ti compound, preferably of the type Si-$(OR)_4$ or $Ti(OR)_4$ dissolved in a suitable solvent, which is deposited on the foil surface. Subsequently the solvent is evaporated and the remaining organic compound thermally decomposed to the corresponding oxide or to a mixed oxide with aluminum. Suitable for this purpose are blank, boehmitized foils or foils bearing a barrier layer. A further preferred method according to the invention for covering with an oxide layer comprises the transportation of an organic Si of Ti compound, via a water-free substrate, onto the foil surface which may be blank or bear a boehmite or barrier oxide layer, and subsequently transforming the Si or Ti compound into $SiO_2$ of $TiO_2$ by hydrolysis.

It has been found that with the partially permeable membrane produced according to the process of the invention, because of its specific properties, it is preferably to be used for ultra-fine filtration purposes in which a part of a fluid passes through the membrane under a pressure of some tenths of a MPa and the particles therein, particles of a minimum diameter of 1 to 100 nm—for example. colloids, macromolecules of small bacteria—are held back.

A composite comprising this membrane and a thin, porous polymer membrane also exhibits excellent properties in use as an ultra-fine filter.

The special structure of the membranes produced according to the invention viz., large surface area, small diameter and small distance between the pores has been found to be very suitable for use as a composite membrane for separating gases or pervaporation. In such composite membranes the etched and subsequently treated aluminum foil serves as a substrate for a pore-free, approx. 0.1 to 0.2 μm thick polymer layer. A component then passes through the composite membrane under a pressure of 0.1 to 10 MPa, in that it diffuses through the polymer layer while other components are held back. The large surface area and the small distance between the pores is of decisive importance as a means of arriving at higher transmembrane flow rates. The small pore diameter in turn enables the necessary support to be given to the thin polymer layer that is under hydrostatic pressure.

We claim:

1. Process for manufacturing a partially permeable membrane from an aluminum foil using electrolytic etching, which comprises: providing a 20–200 μm thick foil in the non-recrystallized condition; etching said foil in an electrolyte at a current density in the range 2–20 $kA/m^2$ to form a partially permeable aluminum foil membrane having through-flow pores suitable for use for ultrafiltration; and stabilizing the surface of the resultant product to prevent hydration reactions.

2. A process according to claim 1 wherein a foil having an aluminum content of at least 99.95% is employed.

3. A process according to claim 1 wherein a 20–200 μm thick aluminum foil is employed and is etched only on one side.

4. A process according to claim 3 wherein the non-etched side is coated with an etch resistant layer.

5. A process according to claim 1 wherein the etching is performed in stages with the current constant throughout each stage.

6. A process according to claim 1 wherein the electrolyte is maintained at a temperature of 60°–100° C.

7. A process according to claim 1 wherein the etched pores, prior to the stabilizing step, are made narrower by anodizing in a barrier layer electrolyte.

8. A process according to claim 1 wherein a boehmite layer is formed prior to the stabilizing step.

9. A process according to claim 1 wherein the stabilizing after-treatment comprises anodic oxidation in a phosphate-containing electrolyte.

10. A process according to claim 1 wherein for the stabilizing after-treatment, the foil is immersed in a phosphate solution containing 0.5–5% $(NH_4)H_2PO_4$.

11. A process according to claim 10 wherein the phosphate solution flows through the foil.

12. A process according to claim 1 wherein for the stabilizing after-treatment, the foil is immersed in a solution containing a material selected from the group consisting of silicate, chromate and chromophosphate.

13. A process according to claim 1 wherein the stabilizing after-treatment comprises covering the foil with a layer selected from the group consisting of $SiO_2$ and $TiO_2$.

14. A process according to claim 13 wherein an organic Si or Ti compound is precipitated onto the foil surface from a solution, and then thermally decomposed to the oxide.

15. A process according to claim 13 wherein an organic Si or Ti compound is transported onto the surface of the foil via a water-free agent, and is subsequently transformed by hydrolysis to $SiO_2$ or $TiO_2$.

16. A process according to claim 1 including the step of using said membrane for ultrafiltration.

17. A process according to claim 1 including the step of forming a composite of said membrane with a porous polymer membrane to form an ultra-fine filter.

* * * * *